(12) United States Patent
Deutsch et al.

(10) Patent No.: US 11,995,006 B2
(45) Date of Patent: May 28, 2024

(54) ALGEBRAIC AND DETERMINISTIC MEMORY AUTHENTICATION AND CORRECTION WITH COUPLED CACHELINE METADATA

(71) Applicant: Intel Corporation, Santa Clara, CA (US)

(72) Inventors: Sergej Deutsch, Hillsboro, OR (US); Karanvir Grewal, Hillsboro, OR (US); David M. Durham, Beaverton, OR (US); Rajat Agarwal, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 343 days.

(21) Appl. No.: 17/559,258

(22) Filed: Dec. 22, 2021

(65) Prior Publication Data
US 2022/0114112 A1 Apr. 14, 2022

(51) Int. Cl.
*G06F 21/00* (2013.01)
*G06F 11/07* (2006.01)
(Continued)

(52) U.S. Cl.
CPC ...... *G06F 12/1466* (2013.01); *G06F 11/0772* (2013.01); *G06F 11/1068* (2013.01); *G06F 12/0853* (2013.01); *G06F 12/1408* (2013.01)

(58) Field of Classification Search
CPC ............. G06F 12/1466; G06F 11/0772; G06F 11/1068; G06F 12/0853; G06F 12/1408;
(Continued)

(56) References Cited

U.S. PATENT DOCUMENTS 11,301,344 B2 4/2022 Durham et al.
11,469,902 B2 10/2022 Kounavis et al.
(Continued)

FOREIGN PATENT DOCUMENTS

CN 116383103 A 7/2023
EP 4202685 A1 6/2023

OTHER PUBLICATIONS

Zhang, Wei. "Replication cache: A small fully associative cache to improve data cache reliability." IEEE Transactions on Computers 54.12 (2005): 1547-1555. (Year: 2005).*
(Continued)

*Primary Examiner* — Ka Shan Choy
(74) *Attorney, Agent, or Firm* — Compass IP Law PC (57) ABSTRACT

A method comprises generating, for a cacheline, a first tag and a second tag, the first tag and the second tag generated as a function of user data stored and metadata in the cacheline stored in a first memory device, and a multiplication parameter derived from a secret key, storing the user data, the metadata, the first tag and the second tag in the first cacheline of the first memory device; generating, for the cacheline, a third tag and a fourth tag, the third tag and the fourth tag generated as a function of the user data stored and metadata in the cacheline stored in a second memory device, and the multiplication parameter; storing the user data, the metadata, the third tag and the fourth tag in the corresponding cache line of the second memory device; receiving, from a requesting device, a read operation directed to the cacheline; and using the first tag, the second tag, the third tag, and the fourth tag to determine whether a read error occurred during the read operation.

21 Claims, 6 Drawing Sheets

(51) Int. Cl.
*G06F 11/10* (2006.01)
*G06F 12/0853* (2016.01)
*G06F 12/14* (2006.01)

(58) Field of Classification Search
CPC ............. G06F 21/79; G06F 2212/1032; G06F 2212/1052; G06F 2212/402; G06F 11/1064; G06F 12/0895
See application file for complete search history.

(56) References Cited

U.S. PATENT DOCUMENTS

| | | | |
|---|---|---|---|
| 2014/0047265 A1* | 2/2014 | Das | G06F 11/1666 714/54 |
| 2015/0026538 A1* | 1/2015 | Sakai | G11B 20/1833 714/764 |
| 2015/0040226 A1* | 2/2015 | Barau | G06F 11/1076 714/764 |
| 2016/0162357 A1* | 6/2016 | Desireddi | G06F 11/1068 714/764 |
| 2019/0324913 A1 | 10/2019 | Chhabra | |
| 2021/0141692 A1* | 5/2021 | Agarwal | H03M 13/19 |

OTHER PUBLICATIONS

Extended European Search Report in EP Application 22201178.5, dated May 4, 2023, 9 pages.

* cited by examiner

ALGEBRAIC AND DETERMINISTIC MEMORY AUTHENTICATION AND CORRECTION WITH COUPLED CACHELINE METADATA

BACKGROUND

Subject matter described herein relates generally to the field of computer security and more particularly to algebraic and deterministic memory authentication and correction with coupled cacheline metadata.

Existing security techniques force users to choose between security (e.g., memory integrity) on one hand and robustness features (e.g., error correction in platforms) on the other hand. For example, using all error correction code (ECC) memory for reliability, availability, and serviceability (RAS) to provide complete single device data correction (SDDC) capabilities or stealing some of the ECC bits to provide memory integrity against Row Hammer attacks with reduced reliability, availability, and serviceability, or instead using those bits for performance optimization features. Accordingly, techniques to implement security with limited memory resources may find utility.

BRIEF DESCRIPTION OF THE DRAWINGS

The detailed description is described with reference to the accompanying figures.

DETAILED DESCRIPTION

Described herein are exemplary systems and methods to implement algebraic and deterministic memory authentication and correction with coupled cacheline metadata. In the following description, numerous specific details are set forth to provide a thorough understanding of various examples. However, it will be understood by those skilled in the art that the various examples may be practiced without the specific details. In other instances, well-known methods, procedures, components, and circuits have not been illustrated or described in detail so as not to obscure the examples.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

As described briefly above, existing security techniques force users to choose between security (e.g., memory integrity) on one hand and robustness features (e.g. error correction in platforms) on the other hand. Additionally, other usages related to performance or features may require additional metadata. Single-device data correction (SDDC) is an important reliability, availability, and serviceability (RAS) feature in server products. However, single-device data correction (SDDC) solutions in 10×4 dynamic random access memory (DRAM) dual in-line memory modules (DIMMs) leave no free bits for encoding security and functional metadata, such as multi-key total memory encryption (MKTME) keys, trust domain (TD) bits, two-level memory (2LM) bits, poison, etc.

To address these and other issues, described herein are systems and methods to implement Message Authentication Galois Integrity and Correction (MAGIC) to support single-device data correction (SDDC) and implicit metadata storage, while still providing cryptographic integrity. Single-device data correction is a crucial reliability, availability, and serviceability (RAS) feature for server random access memory (RAM).

Figure 1:
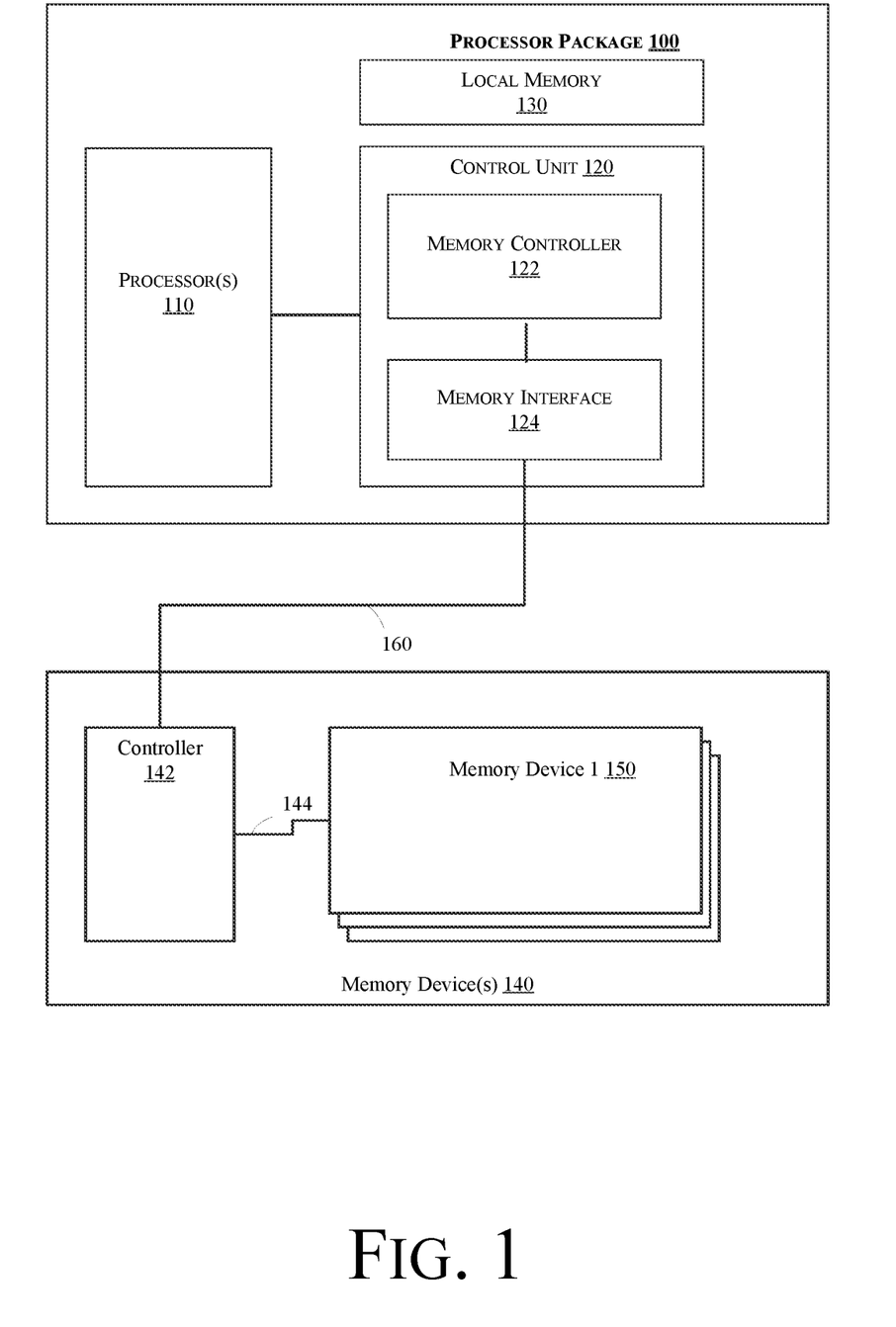
FIG. 1 is a schematic, block diagram illustration of components of apparatus to implement algebraic and deterministic memory authentication and correction with coupled cacheline metadata in accordance with some examples.

Existing implementations do not provide deterministic correction of a failed device if there was additional metadata (per cacheline) stored as part of ECC bits. Rather, error correction is probabilistic, i.e., for certain error bit patterns it is not possible to locate and correct a failed device. Existing implementations use conventional ECC and sequestered memory to store additional ECC bits for correcting data in case of a full-device failure. However, these solutions need to reserve memory for overflow ECC and have bandwidth overhead due to additional accesses to sequestered memory on every write. Further, In some examples described herein, a certain type of metadata may be embedded into memory authentication and correction single device data correction capability (e.g., using Reed-Solomon codes). The metadata may be shared between pairs of cachelines (e.g., per-page encryption key IDs, per-page trust domain (TD) bit, two-level memory (2LM) bits) and encoded into the error-correcting code for both cachelines. Error-free reads can recover the metadata. In a rare case of error, the metadata may be recovered from the coupled cachelines from a different dynamic random access memory (DRAM) rank (or a different DIMM) and then used to correct the error in the first cacheline. This enables single-device data correction (SDDC) and metadata storage, while still providing cryptographic integrity with no significant additional memory overhead nor performance impact. Further structural and methodological details are relating to implementing algebraic and deterministic memory authentication and correction with coupled cacheline metadata are described below with reference to FIG. 1 through FIG. 6, below FIG. 1 is a schematic, block diagram illustration of components of apparatus to implement algebraic and deterministic memory authentication and correction with coupled cacheline metadata in accordance with some examples. Referring to FIG. 1, in some examples a processor 100 may comprise one or more processors 110 coupled to a control unit 120 and a local memory 130. Control unit 120 comprises a memory controller 122 and a memory interface 124.

Memory interface 124 is coupled to one or more remote memory devices 140 by a communication bus 160. Memory device 140 may comprise a controller 142 and one or more memory devices 150. In various examples, at least some of the memory banks 150 may be implemented using nonvolatile memory, e.g., phase change memory, ferroelectric random-access memory (FeTRAM), nanowire-based non-volatile memory, memory that incorporates memristor technology, a static random access memory (SRAM), three dimensional (3D) cross point memory such as phase change memory (PCM), spin-transfer torque memory (STT-RAM) or NAND memory. In some examples the memory device(s) 140 may comprise one or more nonvolatile direct in-line memory modules (NVDIMMs) coupled to a memory channel 144 which provides a communication link to controller 142. The specific configuration of the memory device(s) 150 in the memory device(s) 140 is not critical. In some examples the techniques relating to implementing algebraic and deterministic memory authentication and correction with coupled cacheline metadata may be implemented in the memory controller 142, alone or in combination with the memory controller 122 an/or the processor(s) 110.

Figure 2:
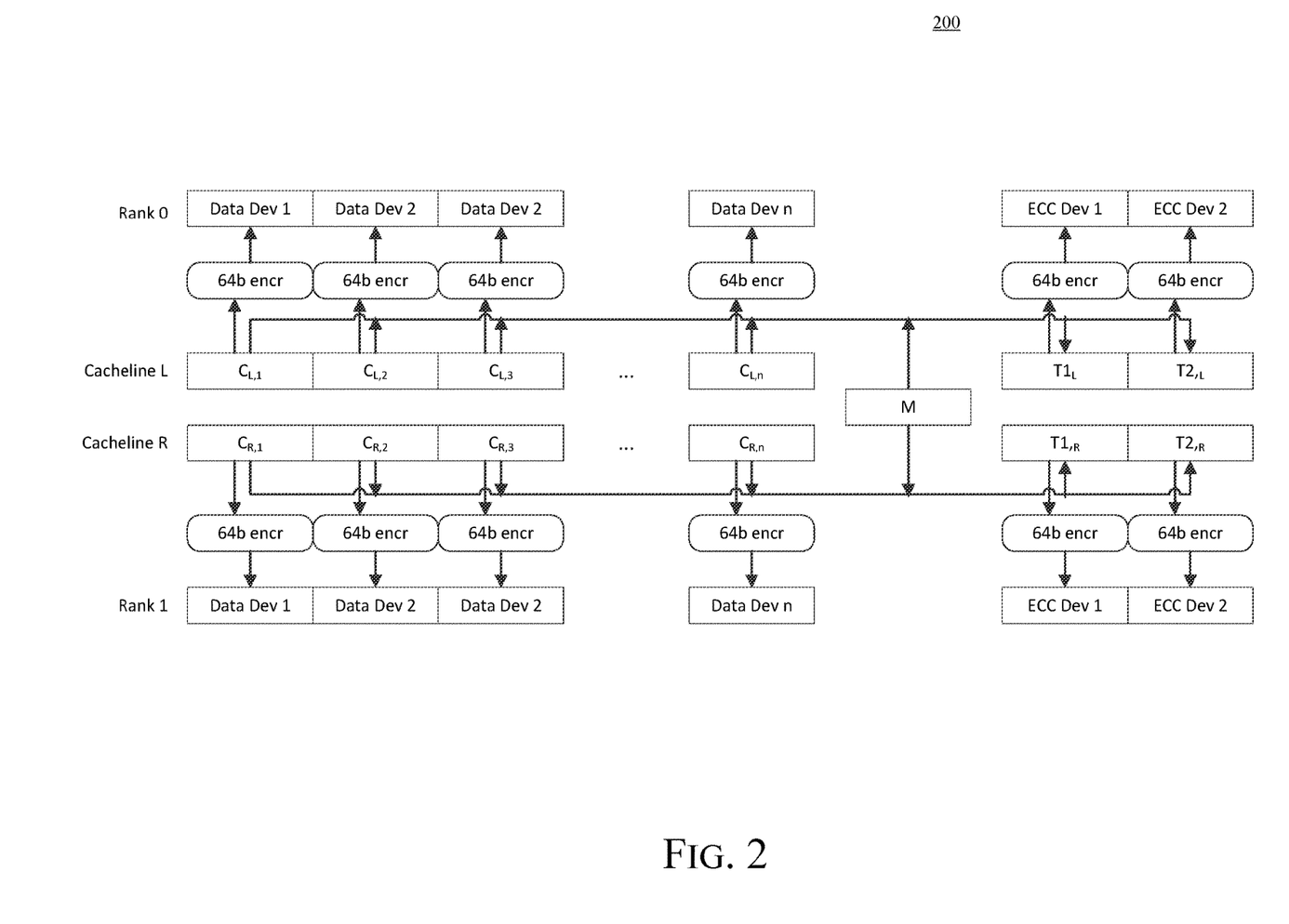
FIG. 2 is a schematic illustration of a memory device in an implementation of algebraic and deterministic memory authentication and correction with coupled cacheline metadata in accordance with some examples.

FIG. 2 is a schematic illustration of a memory device 200 in an implementation of algebraic and deterministic memory authentication and correction with coupled cacheline metadata in accordance with some examples. Referring to FIG. 2, it will be evident that all cachelines can be split into clusters of at least two cachelines such that every cacheline of the group has the same metadata. For instance, each pair of cachelines with address 2*i and 2*i+1 share the same metadata. This condition is satisfied for any per-page metadata such as multi-key total memory encryption (MKTME) key IDs, TD bit. It is also satisfied for 2LM bits, as three-dimensional cross point (3DXP) memory stores data in blocks equal 2 cachelines.

There is at least one pair of cachelines within a cluster that are written into a different set of devices. From the example depicted in FIG. 2, cachelines with address 2*i are written to Rank 0 and cachelines with addresses 2 are written into Rank 1 of the DIMM. Alternatively, the cacheline pairs may be split across two DIMMs. Note that each cacheline is still fully contained within one Rank.

Figure 3:
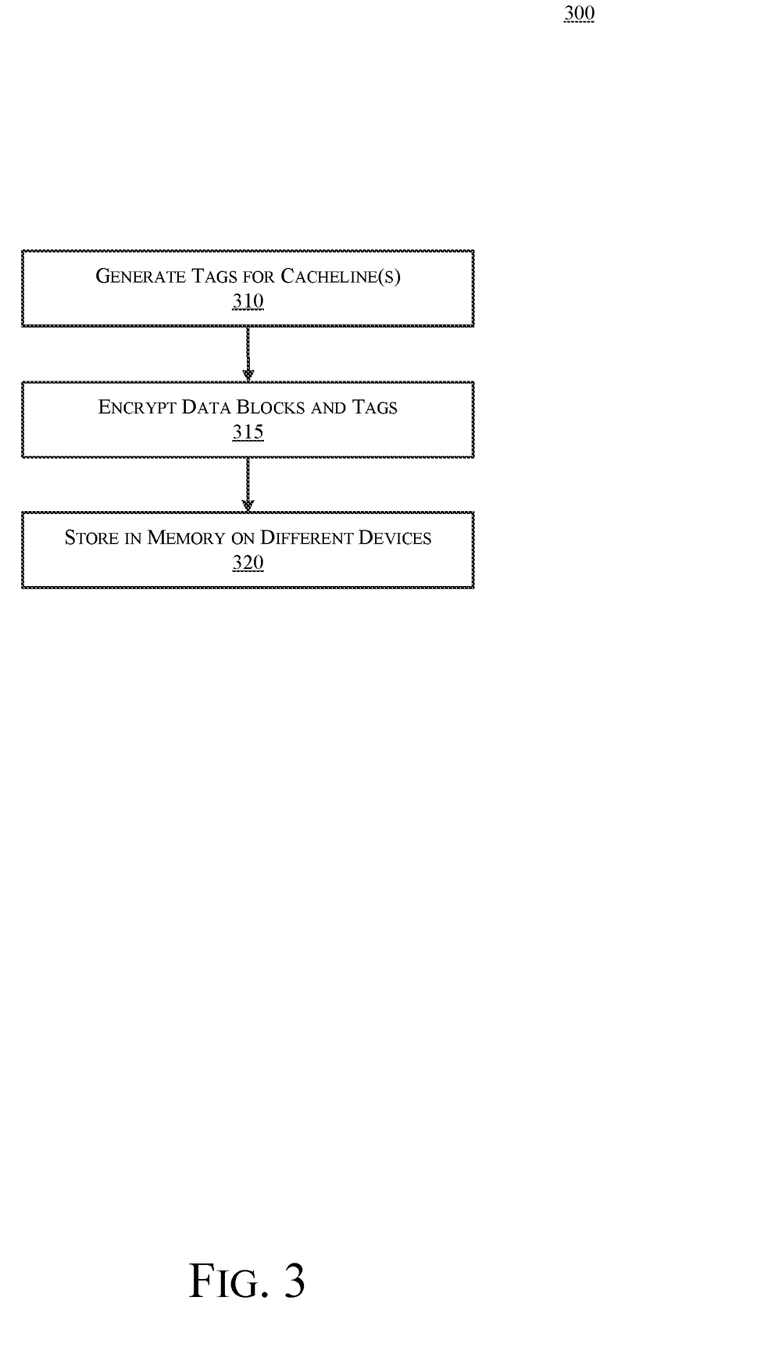
FIG. 3 is a flowchart illustrating operations in a method to implement algebraic and deterministic memory authentication and correction with coupled cacheline metadata in accordance with some examples.

FIG. 3 is a flowchart illustrating operations in a method 300 to implement algebraic and deterministic memory authentication and correction with coupled cacheline metadata in accordance with some examples. Referring to FIG. 3, at operation 310 a memory authentication and correction algorithm generates two tags for each cacheline using the cacheline data (e.g., 8×64b blocks) and metadata (e.g., 1×64b block). The metadata M is the same for both cachelines, whereas the data blocks C are independent. In some examples, the tags may be generated using multiplication and addition in GF(2^64). The addition in GF is equivalent to XOR.

$$T_{1,L} = C_{L,1}H^1 + C_{L,2}H^2 + \ldots + C_{L,8}H^8 + M \quad (1)$$

$$T_{2,L} = C_{L,1}H^2 + C_{L,2}H^4 + \ldots + C_{L,8}H^{16} + M \quad (2)$$

$$T_{1,R} = C_{R,1}H^1 + C_{R,2}H^2 + \ldots + C_{R,8}H^8 + M \quad (3)$$

$$T_{2,R} = C_{R,1}H^2 + C_{R,2}H^4 + \ldots + C_{R,8}H^{16} + M \quad (4)$$

Where H is a multiplication parameter derived from a secret (i.e., cryptographic key, which is generated or programmed on the hardware. At operation 315 the data blocks C and the tags T are blinded via encryption and at operation 320 the resulting blocks are stored in memory, as illustrated in FIG. 2. Cacheline L and cacheline R are stored in a different set of devices on the DIMM, e.g., in different ranks. With this split, a device failure will only affect one cacheline from the cacheline pair L+R.

Figure 4:
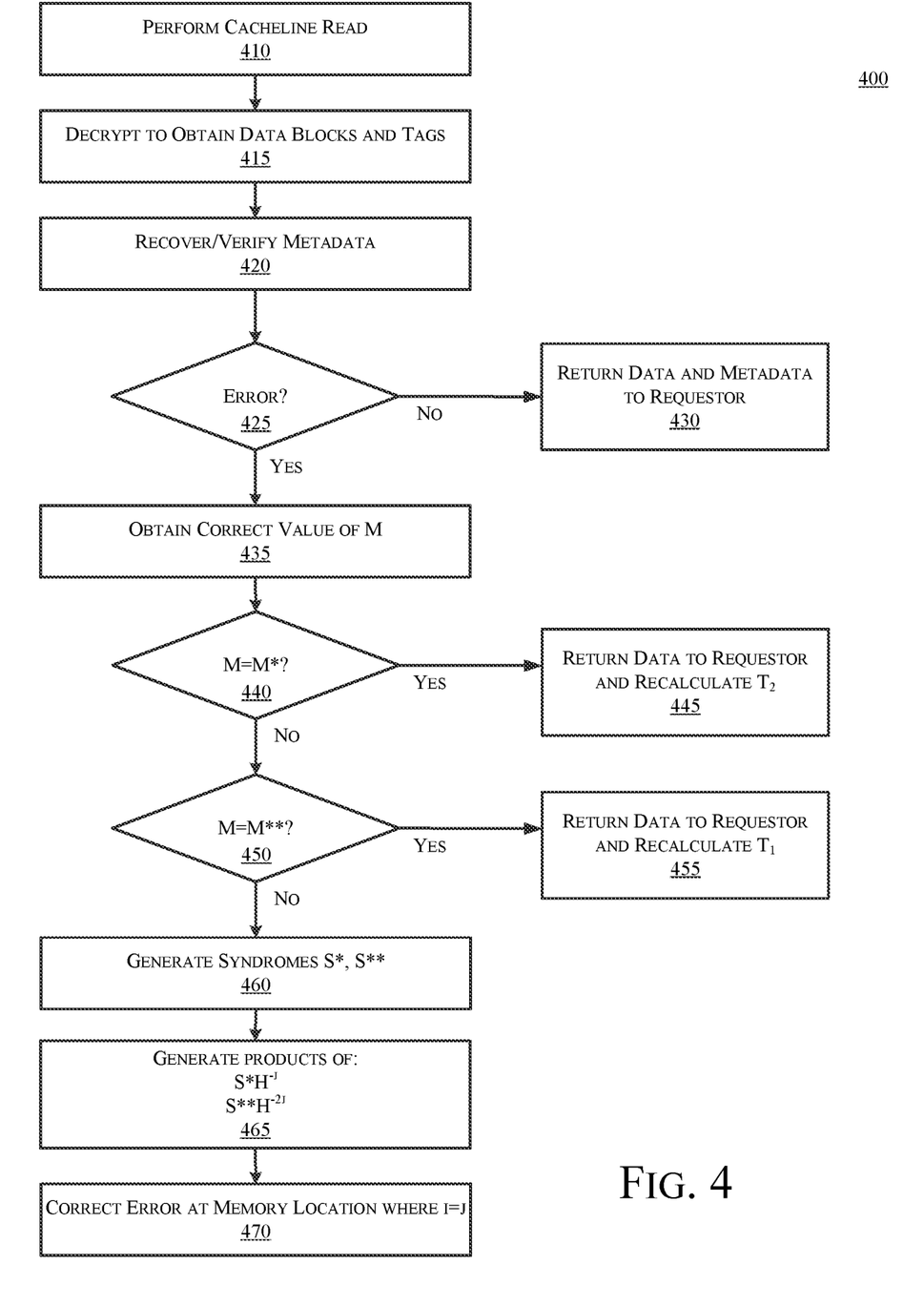
FIG. 4 is a flowchart illustrating operations in a method to implement algebraic and deterministic memory authentication and correction with coupled cacheline metadata in accordance with some examples.

The tags stored in cache may be used in subsequent error correction operations. FIG. 4 is a flowchart illustrating operations in a method to implement algebraic and deterministic memory authentication and correction with coupled cacheline metadata in accordance with some examples. Referring to FIG. 4, at operation 410 a cacheline read is performed. On the cacheline read (L or R), the values received from the DRAM are decrypted at operation 415 to obtain blocks $C_1 \ldots C_n$, and tags $T_1$ and $T_2$. The following example shows data authentication and correction for cacheline L depicted in FIG. 2. This process is identical for cacheline R (replace all indices with "R"). At operation 420 the metadata for cacheline L, is recovered and verified using the following equations derived from (1) and (2):

$$M^* = C_{L,1}H^1 + C_{L,2}H^2 + \ldots + C_{L,8}H^8 + T_{1,L} \quad (5)$$

$$M^* = C_{L,1}H^2 + C_{L,2}H^4 + \ldots + C_{L,8}H^{16} + T_{2,L} \quad (6)$$

At operation 425 it is determined whether there is an error in the recovered metadata. If there was no error, (i.e., M* and M** are equal to the original metadata M) then operation 430 is implemented and the cacheline data and the metadata can be returned to the entity that requested the cacheline data (e.g., a CPU or other host device). By contrast, if at operation 425 an error pattern occurred in one of the blocks (either $C_i$ or $T_1$ or $T_2$), then M* and M** will be different, indicating a read error in cacheline L. Assuming an error E in device i, error correction may be performed in multiple steps.

In a first step, at operation 435, the correct value of M is obtained from the coupled cacheline. In some examples, this may be done by performing a normal read from the cacheline R and recovering M as described in Equations (5) and (6), above. It is assumed that the coupled cacheline R is error-free, since it resides in different DRAM devices (e.g., rank). In the event that the cacheline R is also corrupted, e.g., due to a multiple-device failure, a notification of detectable but uncorrectable error may be returned.

Using the recovered value of M, the failed device may be located and corrected. There will be three possible scenarios. In a first scenario, at operation 440, it is determined whether the value of M is equal to M*. If, at operation 440, the value of M is equal to M* then data blocks $C_1 \ldots C_n$ and tag $T_1$ are correct, and the error is in $T_2$. Thus, at operation 445 the data is associated with data blocks $C_1 \ldots C_n$ is returned to the requestor without modifications and the tag $T_2$ is recalculated and updated in memory.

In a second scenario, at operation 450, it is determined whether the value of M is equal to M. If, at operation 450, M is equal to M, then data blocks $C_1 \ldots C_n$ and tag $T_2$ are correct, and the error is in $T_1$. Thus, at operation 455, the data associated with data blocks $C_1 \ldots C_n$ is returned to the requestor without modifications and the tag $T_1$ is recalculated and updated in memory.

In a third scenario, M is equal to neither M* nor M**. In this scenario, the error is assumed to be in one of the data blocks C . . . G. Suppose the error E occurred in device i. To determine i and E, a operation 460 syndromes S* and S** are generated by XORing M* with M and $T_{1,L}$, as well as XORing M** with M and $T_{2,L}$. This simplifies to:

$$S^* = M^* + M + T_{1,L} = (C_{L,1}H^1 + C_{L,2}H^2 + \ldots + C_{L,8}H^8 + EH^i + T_{1,L}) + M + (C_{L,1}H^1 + C_{L,2}H^2 + \ldots + C_{L,8}H^8 + M) = EH^i$$

$$S^{} = M^{} + M + T_{2,L} = (C_{L,1}H^2 + C_{L,2}H^4 + \ldots + C_{L,8}H^{16} + EH^{2i} + T_{2,L}) + M + (C_{L,1}H^2 + C_{L,2}H^4 + \ldots + C_{L,8}H^{16} + M) = EH^{2i}$$

Note that syndromes S* and S** depend only on the error pattern and the error location. To determine the location, the products of S* with $H^{-j}$, where j=1 . . . n, as well as products of S** with $H^{-2j}$ are generated at operation 465, as follows:

$$S^* H^{-j} = EH^i H^{-j} = EH^{i-j}$$

$$S^{**} H^{-2j} = EH^{2i} H^{-2j} = EH^{2(i-j)}$$

Only for i=j these two values will be equal, and namely equal the error pattern. This provides the memory location of the error i and the error pattern E. At operation 470, to correct the erroneous data block i, the value that was read from the memory is XORed with the error pattern E, which will undo the error.

Split Metadata

Figure 5:
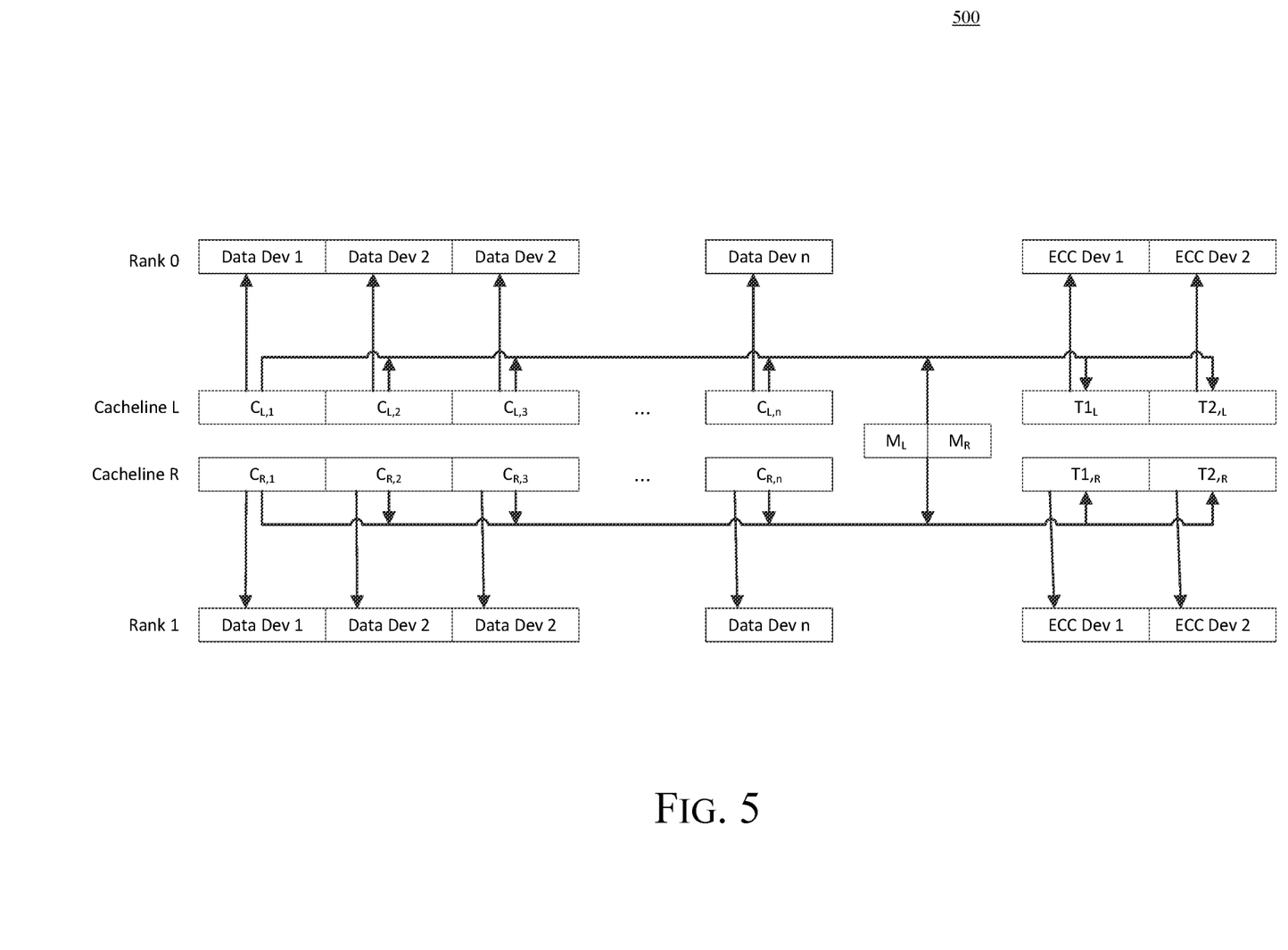
FIG. 5 is a schematic illustration of a memory device in an implementation of algebraic and deterministic memory authentication and correction with coupled cacheline metadata in accordance with some examples.

Some DIMM configurations require metadata that is unique per cacheline. The technique described above can be applied to such configurations with minor adjustments. First, the metadata block is split to hold metadata from both cachelines, i.e., the metadata block is a concatenation of metadata bits of cacheline L and metadata bits of cacheline R: $M = \{M_L \| M_R\}$. This is shown in FIG. 5, which is a schematic illustration of a memory device 500 in an implementation of algebraic and deterministic memory authentication and correction with coupled cacheline metadata in accordance with some examples.

Writes to cacheline L require reading the coupled cacheline R, updating the tags $T_{1,R}$, $T_{2,R}$ (since they depend on $M_L$) and writing the updated cacheline R to memory. The authentication and the correction algorithms for this variation are the same as described above When used in conjunction with memory integrity, a tweakable block cipher may be used to encrypt Reed Solomon symbols and inputs to the error correction codes. The size of correction symbol is determined by the encryption block size. Encrypting the data inputs and symbols is an effective solution to row hammer style attacks on DRAM, while maintaining error correction capabilities. This is because the block cipher prevents an adversary from knowing the data inputs and symbols or error correction code/parity values. But since Reed Solomon and similar codes operate on a symbol granularity, with full correction of an integer number of symbols, encrypting a symbol with a block cipher equal to the symbol size maintains the error correction characteristics while also hiding the original symbol value from an adversary as decrypting the symbol cipher text using a secret key is required to determine the corresponding symbol used for error correction. Thus, an adversary, for example, by tampering with the physical memory, cannot deterministically set a symbol to cause undetected data corruption. Similarly, the tweakable block cipher may include additional information such as the symbol location and/or memory address to modify the resulting cipher text, and thus, making the symbols position dependent and preventing symbol relocation and translation (for example, using XEX-based tweaked-codebook mode with ciphertext stealing XTS mode). In this way, a variety of correction modes are possible with memory integrity.

Figure 6:
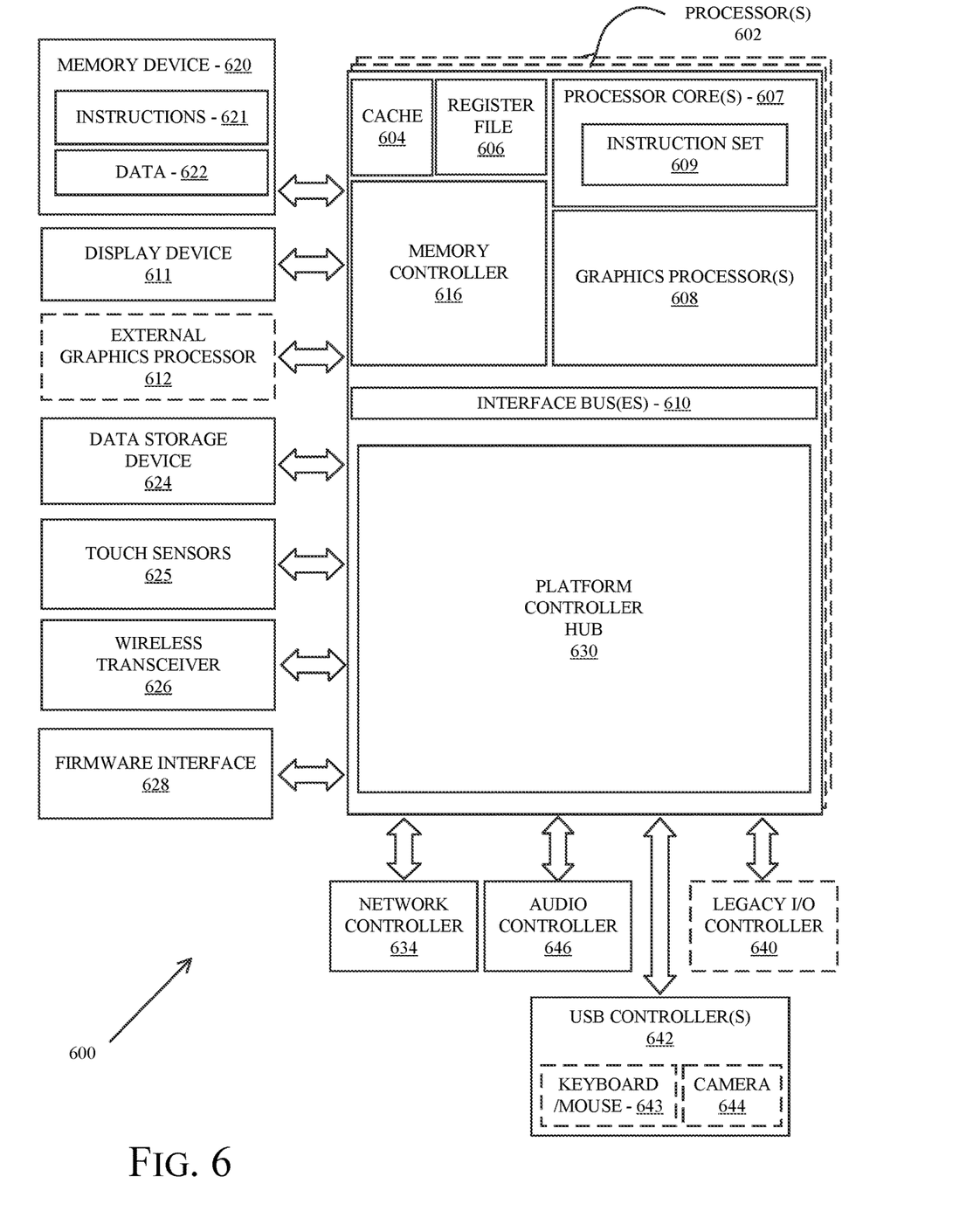
FIG. 6 is a schematic illustration of a computing architecture which may be adapted to implement algebraic and deterministic memory authentication and correction with coupled cacheline metadata in accordance with some examples.

FIG. 6 illustrates an embodiment of an exemplary computing architecture that may be suitable for implementing various embodiments as previously described. In various embodiments, the computing architecture 600 may comprise or be implemented as part of an electronic device. In some embodiments, the computing architecture 600 may be representative, for example of a computer system that implements one or more components of the operating environments described above. In some embodiments, computing architecture 600 may be representative of one or more portions or components of a digital signature signing system that implement one or more techniques described herein. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 600. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 600 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 600.

As shown in FIG. 6, the computing architecture 600 includes one or more processors 602 and one or more graphics processors 608, and may be a single processor desktop system, a multiprocessor workstation system, or a server system having a large number of processors 602 or processor cores 607. In on embodiment, the system 600 is a processing platform incorporated within a system-on-a-chip (SoC or SOC) integrated circuit for use in mobile, handheld, or embedded devices.

An embodiment of system 600 can include, or be incorporated within, a server-based gaming platform, a game console, including a game and media console, a mobile gaming console, a handheld game console, or an online game console. In some embodiments system 600 is a mobile phone, smart phone, tablet computing device or mobile Internet device. Data processing system 600 can also include, couple with, or be integrated within a wearable device, such as a smart watch wearable device, smart eyewear device, augmented reality device, or virtual reality device. In some embodiments, data processing system 600 is a television or set top box device having one or more processors 602 and a graphical interface generated by one or more graphics processors 608.

In some embodiments, the one or more processors 602 each include one or more processor cores 607 to process instructions which, when executed, perform operations for system and user software. In some embodiments, each of the one or more processor cores 607 is configured to process a specific instruction set 609. In some embodiments, instruction set 609 may facilitate Complex Instruction Set Computing (CISC), Reduced Instruction Set Computing (RISC), or computing via a Very Long Instruction Word (VLIW). Multiple processor cores 607 may each process a different instruction set 609, which may include instructions to facilitate the emulation of other instruction sets. Processor core 607 may also include other processing devices, such a Digital Signal Processor (DSP).

In some embodiments, the processor 602 includes cache memory 604. Depending on the architecture, the processor 602 can have a single internal cache or multiple levels of internal cache. In some embodiments, the cache memory is shared among various components of the processor 602. In some embodiments, the processor 602 also uses an external cache (e.g., a Level-3 (L3) cache or Last Level Cache (LLC)) (not shown), which may be shared among processor cores 607 using known cache coherency techniques. A register file 606 is additionally included in processor 602 which may include different types of registers for storing different types of data (e.g., integer registers, floating point registers, status registers, and an instruction pointer register). Some registers may be general-purpose registers, while other registers may be specific to the design of the processor 602.

In some embodiments, one or more processor(s) 602 are coupled with one or more interface bus(es) 610 to transmit communication signals such as address, data, or control signals between processor 602 and other components in the system. The interface bus 610, in one embodiment, can be a processor bus, such as a version of the Direct Media Interface (DMI) bus. However, processor busses are not limited to the DMI bus, and may include one or more Peripheral Component Interconnect buses (e.g., PCI, PCI Express), memory busses, or other types of interface busses. In one embodiment the processor(s) 602 include an integrated memory controller 616 and a platform controller hub 630. The memory controller 616 facilitates communication between a memory device and other components of the system 600, while the platform controller hub (PCH) 630 provides connections to I/O devices via a local I/O bus.

Memory device 620 can be a dynamic random-access memory (DRAM) device, a static random-access memory (SRAM) device, flash memory device, phase-change memory device, or some other memory device having suitable performance to serve as process memory. In one embodiment the memory device 620 can operate as system memory for the system 600, to store data 622 and instructions 621 for use when the one or more processors 602 executes an application or process. Memory controller hub 616 also couples with an optional external graphics processor 612, which may communicate with the one or more graphics processors 608 in processors 602 to perform graphics and media operations. In some embodiments a display device 611 can connect to the processor(s) 602. The display device 611 can be one or more of an internal display device, as in a mobile electronic device or a laptop device or an external display device attached via a display interface (e.g., DisplayPort, etc.). In one embodiment the display device 611 can be a head mounted display (HMD) such as a stereoscopic display device for use in virtual reality (VR) applications or augmented reality (AR) applications.

In some embodiments the platform controller hub 630 enables peripherals to connect to memory device 620 and processor 602 via a high-speed I/O bus. The I/O peripherals include, but are not limited to, an audio controller 646, a network controller 634, a firmware interface 628, a wireless transceiver 626, touch sensors 625, a data storage device 624 (e.g., hard disk drive, flash memory, etc.). The data storage device 624 can connect via a storage interface (e.g., SATA) or via a peripheral bus, such as a Peripheral Component Interconnect bus (e.g., PCI, PCI Express). The touch sensors 625 can include touch screen sensors, pressure sensors, or fingerprint sensors. The wireless transceiver 626 can be a Wi-Fi transceiver, a Bluetooth transceiver, or a mobile network transceiver such as a 3G, 4G, or Long Term Evolution (LTE) transceiver. The firmware interface 628 enables communication with system firmware, and can be, for example, a unified extensible firmware interface (UEFI). The network controller 634 can enable a network connection to a wired network. In some embodiments, a high-performance network controller (not shown) couples with the interface bus 610. The audio controller 646, in one embodiment, is a multi-channel high definition audio controller. In one embodiment the system 600 includes an optional legacy I/O controller 640 for coupling legacy (e.g., Personal System 2 (PS/2)) devices to the system. The platform controller hub 630 can also connect to one or more Universal Serial Bus (USB) controllers 642 connect input devices, such as keyboard and mouse 643 combinations, a camera 644, or other USB input devices.

The following pertains to further examples.

Example 1 is an apparatus, comprising processing circuitry to generate, for a cacheline, a first tag and a second tag, the first tag and the second tag generated as a function of user data stored and metadata in the cacheline stored in a first memory device, and a multiplication parameter derived from a secret key; store the user data, the metadata, the first tag and the second tag in the first cacheline of the first memory device; generate, for the cacheline, a third tag and a fourth tag, the third tag and the fourth tag generated as a function of the user data stored and metadata in the cacheline stored in a second memory device, and the multiplication parameter; store the user data, the metadata, the third tag and the fourth tag in the corresponding cache line of the second memory device; receive, from a requesting device, a read operation directed to the cacheline; and use the first tag, the second tag, the third tag, and the fourth tag to determine whether a read error occurred during the read operation.

In Example 2, the subject matter of Example 1 can optionally include processing circuitry to encrypt the user data, the metadata, the first tag and the second tag prior to storing the user data, the metadata, the first tag and the second tag in the first memory device; and encrypt the user data, the metadata, the third tag and the fourth tag prior to storing the user data, the metadata, the third tag and the fourth tag in the corresponding cache line of the second memory device.

In Example 3, the subject matter of any one of Examples 1-2 can optionally include processing circuitry to decrypt the user data, the metadata, the first tag and the second tag after reading the user data, the metadata, the first tag and the second tag in the first memory device; and decrypt the user data, the metadata, the third tag and the fourth tag after reading the user data, the metadata, the third tag and the fourth tag in the corresponding cache line of the second memory device.

In Example 4, the subject matter of any one of Examples 1-3 can optionally include processing circuitry to in response to the read request, return the user data to the requesting device in response to a determination that the metadata retrieved from the cacheline in the first memory device matches the metadata retrieved from the corresponding cache line in the second memory device.

In Example 5, the subject matter of any one of Examples 1-4 can optionally include processing circuitry to obtain a correct value of the metadata in response to a determination that the metadata retrieved from the cacheline in the first memory device does not match the metadata retrieved from the corresponding cache line in the second memory device.

In Example 6, the subject matter of any one of Examples 1-5 can optionally processing circuitry to perform at least one of return, to the requesting device, the user data stored in the first memory device in response to a determination that the metadata retrieved from the cacheline in the first memory device matches a correct value of the metadata; or return, to the requesting device, the user data stored in the second memory device in response to a determination that the metadata retrieved from the corresponding cacheline in the second memory device matches a correct value of the metadata.

In Example 7, the subject matter of any one of Examples 1-6 can optionally include processing circuitry to generate a first syndrome from the user data, the first tag, the second tag, and the metadata stored in the first memory device and the correct value of the metadata; generate a second syndrome from the user data, the first tag, the second tag, and the metadata stored in the second memory device, and the correct value of the metadata; and locate a source of a read error using the first syndrome and the second syndrome.

Example 8 is a computer-based method, comprising generating, for a cacheline, a first tag and a second tag, the first tag and the second tag generated as a function of user data stored and metadata in the cacheline stored in a first memory device, and a multiplication parameter derived from a secret key; storing the user data, the metadata, the first tag and the second tag in the first cacheline of the first memory device; generating, for the cacheline, a third tag and a fourth tag, the third tag and the fourth tag generated as a function of the user data stored and metadata in the cacheline stored in a second memory device, and the multiplication parameter; store the user data, the metadata, the third tag and the fourth tag in the corresponding cache line of the second memory device; receiving, from a requesting device, a read operation directed to the cacheline; and using the first tag, the second tag, the third tag, and the fourth tag to determine whether a read error occurred during the read operation.

In Example 9, the subject matter of Example 8 further comprising encrypting the user data, the metadata, the first tag and the second tag prior to storing the user data, the metadata, the first tag and the second tag in the first memory device; and encrypting the user data, the metadata, the third tag and the fourth tag prior to storing the user data, the metadata, the third tag and the fourth tag in the corresponding cache line of the second memory device.

In Example 10, the subject matter of any one of Examples 8-9 can optionally include decrypting the user data, the metadata, the first tag and the second tag after reading the user data, the metadata, the first tag and the second tag in the first memory device; and decrypting the user data, the metadata, the third tag and the fourth tag after reading the user data, the metadata, the third tag and the fourth tag in the corresponding cache line of the second memory device.

In Example 11, the subject matter of any one of Examples 8-10 can optionally include in response to the read request, returning the user data to the requesting device in response to a determination that the metadata retrieved from the cacheline in the first memory device matches the metadata retrieved from the corresponding cache line in the second memory device.

In Example 12, the subject matter of any one of Examples 8-11 can optionally include obtaining a correct value of the metadata in response to a determination that the metadata retrieved from the cacheline in the first memory device does not match the metadata retrieved from the corresponding cache line in the second memory device.

In Example 13, the subject matter of any one of Examples 8-12 can optionally include returning, to the requesting device, the user data stored in the first memory device in response to a determination that the metadata retrieved from the cacheline in the first memory device matches a correct value of the metadata; or returning, to the requesting device, the user data stored in the second memory device in response to a determination that the metadata retrieved from the corresponding cacheline in the second memory device matches a correct value of the metadata.

In Example 14, the subject matter of any one of Examples 8-13 can optionally include generating a first syndrome from the user data, the first tag, the second tag, and the metadata stored in the first memory device and the correct value of the metadata; generating a second syndrome from the user data, the first tag, the second tag, and the metadata stored in the second memory device, and the correct value of the metadata; and locating a source of a read error using the first syndrome and the second syndrome.

Example 15 is a non-transitory computer readable medium comprising instructions which, when executed by a processor, configure the processor to generate, for a cacheline, a first tag and a second tag, the first tag and the second tag generated as a function of user data stored and metadata in the cacheline stored in a first memory device, and a multiplication parameter derived from a secret key; store the user data, the metadata, the first tag and the second tag in the first cacheline of the first memory device; generate, for the cacheline, a third tag and a fourth tag, the third tag and the fourth tag generated as a function of the user data stored and metadata in the cacheline stored in a second memory device, and the multiplication parameter; store the user data, the metadata, the third tag and the fourth tag in the corresponding cache line of the second memory device; receive, from a requesting device, a read operation directed to the cacheline; and use the first tag, the second tag, the third tag, and the fourth tag to determine whether a read error occurred during the read operation.

In Example 16, the subject matter of Example 15 can optionally include the subject matter of claim 15, comprising instructions to encrypt the user data, the metadata, the first tag and the second tag prior to storing the user data, the metadata, the first tag and the second tag in the first memory device; and encrypt the user data, the metadata, the third tag and the fourth tag prior to storing the user data, the metadata, the third tag and the fourth tag in the corresponding cache line of the second memory device.

In Example 17, the subject matter of any one of Examples 15-16 can optionally include instructions to decrypt the user data, the metadata, the first tag and the second tag after reading the user data, the metadata, the first tag and the second tag in the first memory device; and decrypt the user data, the metadata, the third tag and the fourth tag after reading the user data, the metadata, the third tag and the fourth tag in the corresponding cache line of the second memory device.

In Example 18, the subject matter of any one of Examples 15-17 can optionally include instructions to in response to the read request, return the user data to the requesting device in response to a determination that the metadata retrieved from the cacheline in the first memory device matches the metadata retrieved from the corresponding cache line in the second memory device.

In Example 19, the subject matter of any one of Examples 15-18 can optionally include instructions to obtain a correct value of the metadata in response to a determination that the metadata retrieved from the cacheline in the first memory device does not match the metadata retrieved from the corresponding cache line in the second memory device.

In Example 20, the subject matter of any one of Examples 15-19 can optionally include instructions to perform at least one of return, to the requesting device, the user data stored in the first memory device in response to a determination that the metadata retrieved from the cacheline in the first memory device matches a correct value of the metadata; or return, to the requesting device, the user data stored in the second memory device in response to a determination that the metadata retrieved from the corresponding cacheline in the second memory device matches a correct value of the metadata.

In Example 21, the subject matter of any one of Examples 15-20 can optionally include instructions to generate a first syndrome from the user data, the first tag, the second tag, and the metadata stored in the first memory device and the correct value of the metadata; generate a second syndrome from the user data, the first tag, the second tag, and the metadata stored in the second memory device, and the correct value of the metadata; and locate a source of a read error using the first syndrome and the second syndrome.

The above Detailed Description includes references to the accompanying drawings, which form a part of the Detailed Description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In addition "a set of" includes one or more elements. In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim. Moreover, in the following claims, the terms "first," "second," "third," etc. are used merely as labels, and are not intended to suggest a numerical order for their objects.

The terms "logic instructions" as referred to herein relates to expressions which may be understood by one or more machines for performing one or more logical operations. For example, logic instructions may comprise instructions which are interpretable by a processor compiler for executing one or more operations on one or more data objects. However, this is merely an example of machine-readable instructions and examples are not limited in this respect.

The terms "computer readable medium" as referred to herein relates to media capable of maintaining expressions which are perceivable by one or more machines. For example, a computer readable medium may comprise one or more storage devices for storing computer readable instructions or data. Such storage devices may comprise storage media such as, for example, optical, magnetic or semiconductor storage media. However, this is merely an example of a computer readable medium and examples are not limited in this respect.

The term "logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA). Also, logic may comprise machine-readable instructions stored in a memory in combination with processing circuitry to execute such machine-readable instructions. However, these are merely examples of structures which may provide logic and examples are not limited in this respect.

Some of the methods described herein may be embodied as logic instructions on a computer-readable medium. When executed on a processor, the logic instructions cause a processor to be programmed as a special-purpose machine that implements the described methods. The processor, when configured by the logic instructions to execute the methods described herein, constitutes structure for performing the described methods. Alternatively, the methods described herein may be reduced to logic on, e.g., a field programmable gate array (FPGA), an application specific integrated circuit (ASIC) or the like.

In the description and claims, the terms coupled and connected, along with their derivatives, may be used. In particular examples, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

Reference in the specification to "one example" or "some examples" means that a particular feature, structure, or characteristic described in connection with the example is included in at least an implementation. The appearances of the phrase "in one example" in various places in the specification may or may not be all referring to the same example.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with each claim standing on its own as a separate embodiment. The scope of the embodiments disclosed herein is to be determined with reference to the appended claims, along with the full scope of equivalents to which such claims are entitled.

Although examples have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. An apparatus, comprising processing circuitry to:
   generate, for a cacheline, a first tag and a second tag, the first tag and the second tag generated as a function of user data stored and metadata in the cacheline stored in a first memory device, and a multiplication parameter derived from a secret key;
   store the user data, the metadata, the first tag and the second tag in the cacheline of the first memory device;
   generate, for the cacheline, a third tag and a fourth tag, the third tag and the fourth tag generated as a function of the user data stored and metadata in the cacheline stored in a second memory device, and the multiplication parameter;
   store the user data, the metadata, the third tag and the fourth tag in a corresponding cacheline of the second memory device;
   receive, from a requesting device, a read operation directed to the cacheline; and
   use the first tag, the second tag, the third tag, and the fourth tag to determine whether a read error occurred during the read operation.

2. The apparatus of claim 1, the processing circuitry to:
   encrypt the user data, the metadata, the first tag and the second tag prior to storing the user data, the metadata, the first tag and the second tag in the first memory device; and
   encrypt the user data, the metadata, the third tag and the fourth tag prior to storing the user data, the metadata, the third tag and the fourth tag in the corresponding cacheline of the second memory device.

3. The apparatus of claim 2, the processing circuitry to:
   decrypt the user data, the metadata, the first tag and the second tag after reading the user data, the metadata, the first tag and the second tag in the first memory device; and
   decrypt the user data, the metadata, the third tag and the fourth tag after reading the user data, the metadata, the third tag and the fourth tag in the corresponding cacheline of the second memory device.

4. The apparatus of claim 1, the processing circuitry to:
   in response to the read operation, return the user data to the requesting device in response to a determination that the metadata retrieved from the cacheline in the first memory device matches the metadata retrieved from the corresponding cacheline in the second memory device.

5. The apparatus of claim 1, the processing circuitry to:
   obtain a correct value of the metadata in response to a determination that the metadata retrieved from the cacheline in the first memory device does not match the metadata retrieved from the corresponding cacheline in the second memory device.

6. The apparatus of claim 5, the processing circuitry to perform one of:
   return, to the requesting device, the user data stored in the first memory device in response to the determination that the metadata retrieved from the cacheline in the first memory device matches the correct value of the metadata; or
   return, to the requesting device, the user data stored in the second memory device in response to the determination that the metadata retrieved from the corresponding cacheline in the second memory device matches the correct value of the metadata.

7. The apparatus of claim 5, the processing circuitry to:
   generate a first syndrome from the user data, the first tag, the second tag, and the metadata stored in the first memory device and the correct value of the metadata;
   generate a second syndrome from the user data, the first tag, the second tag, and the metadata stored in the second memory device, and the correct value of the metadata; and
   locate a source of the read error using the first syndrome and the second syndrome.

8. A computer-based method, comprising:
generating, for a cacheline, a first tag and a second tag, the first tag and the second tag generated as a function of user data stored and metadata in the cacheline stored in a first memory device, and a multiplication parameter derived from a secret key;
storing the user data, the metadata, the first tag and the second tag in the cacheline of the first memory device;
generating, for the cacheline, a third tag and a fourth tag, the third tag and the fourth tag generated as a function of the user data stored and metadata in the cacheline stored in a second memory device, and the multiplication parameter;
storing the user data, the metadata, the third tag and the fourth tag in a corresponding cacheline of the second memory device;
receiving, from a requesting device, a read operation directed to the cacheline; and
using the first tag, the second tag, the third tag, and the fourth tag to determine whether a read error occurred during the read operation.

9. The method of claim 8, further comprising:
encrypting the user data, the metadata, the first tag and the second tag prior to storing the user data, the metadata, the first tag and the second tag in the first memory device; and
encrypting the user data, the metadata, the third tag and the fourth tag prior to storing the user data, the metadata, the third tag and the fourth tag in the corresponding cacheline of the second memory device.

10. The method of claim 9, further comprising:
decrypting the user data, the metadata, the first tag and the second tag after reading the user data, the metadata, the first tag and the second tag in the first memory device; and
decrypting the user data, the metadata, the third tag and the fourth tag after reading the user data, the metadata, the third tag and the fourth tag in the corresponding cacheline of the second memory device.

11. The method of claim 8, further comprising:
in response to the read operation, returning the user data to the requesting device in response to a determination that the metadata retrieved from the cacheline in the first memory device matches the metadata retrieved from the corresponding cacheline in the second memory device.

12. The method of claim 8, further comprising:
obtaining a correct value of the metadata in response to a determination that the metadata retrieved from the cacheline in the first memory device does not match the metadata retrieved from the corresponding cacheline in the second memory device.

13. The method of claim 12, further comprising:
returning, to the requesting device, the user data stored in the first memory device in response to the determination that the metadata retrieved from the cacheline in the first memory device matches the correct value of the metadata; or
returning, to the requesting device, the user data stored in the second memory device in response to the determination that the metadata retrieved from the corresponding cacheline in the second memory device matches the correct value of the metadata.

14. The method of claim 12, further comprising:
generating a first syndrome from the user data, the first tag, the second tag, and the metadata stored in the first memory device and the correct value of the metadata;
generating a second syndrome from the user data, the first tag, the second tag, and the metadata stored in the second memory device, and the correct value of the metadata; and
locating a source of the read error using the first syndrome and the second syndrome.

15. A non-transitory computer readable medium comprising instructions which, when executed by a processor, configure the processor to:
generate, for a cacheline, a first tag and a second tag, the first tag and the second tag generated as a function of user data stored and metadata in the cacheline stored in a first memory device, and a multiplication parameter derived from a secret key;
store the user data, the metadata, the first tag and the second tag in the cacheline of the first memory device;
generate, for the cacheline, a third tag and a fourth tag, the third tag and the fourth tag generated as a function of the user data stored and metadata in the cacheline stored in a second memory device, and the multiplication parameter;
store the user data, the metadata, the third tag and the fourth tag in a corresponding cacheline of the second memory device;
receive, from a requesting device, a read operation directed to the cacheline; and
use the first tag, the second tag, the third tag, and the fourth tag to determine whether a read error occurred during the read operation.

16. The non-transitory computer readable medium of claim 15, comprising instructions to:
encrypt the user data, the metadata, the first tag and the second tag prior to storing the user data, the metadata, the first tag and the second tag in the first memory device; and
encrypt the user data, the metadata, the third tag and the fourth tag prior to storing the user data, the metadata, the third tag and the fourth tag in the corresponding cacheline of the second memory device.

17. The non-transitory computer readable medium of claim 16, comprising instructions to:
decrypt the user data, the metadata, the first tag and the second tag after reading the user data, the metadata, the first tag and the second tag in the first memory device; and
decrypt the user data, the metadata, the third tag and the fourth tag after reading the user data, the metadata, the third tag and the fourth tag in the corresponding cacheline of the second memory device.

18. The non-transitory computer readable medium of claim 15, comprising instructions to:
in response to the read operation, return the user data to the requesting device in response to a determination that the metadata retrieved from the cacheline in the first memory device matches the metadata retrieved from the corresponding cacheline in the second memory device.

19. The non-transitory computer readable medium of claim 15, comprising instructions to:
obtain a correct value of the metadata in response to a determination that the metadata retrieved from the cacheline in the first memory device does not match the metadata retrieved from the corresponding cacheline in the second memory device.

20. The non-transitory computer readable medium of claim 19, comprising instructions to:

return, to the requesting device, the user data stored in the first memory device in response to the determination that the metadata retrieved from the cacheline in the first memory device matches the correct value of the metadata; or return, to the requesting device, the user data stored in the second memory device in response to the determination that the metadata retrieved from the corresponding cacheline in the second memory device matches the correct value of the metadata.

21. The non-transitory computer readable medium of claim 20, further comprising instructions to:

generate a first syndrome from the user data, the first tag, the second tag, and the metadata stored in the first memory device and the correct value of the metadata;

generate a second syndrome from the user data, the first tag, the second tag, and the metadata stored in the second memory device, and the correct value of the metadata; and locate a source of the read error using the first syndrome and the second syndrome.

* * * * *